Sept. 8, 1964     R. A. LADNER     3,147,952

PIN-BLOCK, ADJUSTABLE DIAPHRAGM SUPPORT

Filed Jan. 28, 1963     2 Sheets-Sheet 1

WITNESSES:

INVENTOR
Richard A. Ladner

Sept. 8, 1964     R. A. LADNER     3,147,952
PIN-BLOCK, ADJUSTABLE DIAPHRAGM SUPPORT
Filed Jan. 28, 1963     2 Sheets-Sheet 2

United States Patent Office 3,147,952
Patented Sept. 8, 1964

3,147,952
PIN-BLOCK, ADJUSTABLE DIAPHRAGM
SUPPORT
Richard A. Ladner, Camden, N.J., assignor to Westinghouse Electric Corporation, Pittsburgh, Pa., a corporation of Pennsylvania
Filed Jan. 28, 1963, Ser. No. 254,219
5 Claims. (Cl. 253—39)

This invention relates to elastic fluid utilizing machines of the axial flow type and particularly machines of this type having bladed diaphragms.

In elastic fluid utilizing machines, for example axial flow turbines having a series of pressure stages, it is common practice to divide the casing structure into the various stages by providing diaphragm members which surround the rotor shaft and are contained by the casing wall. This type of turbine casing is generally split along a horizontal plane into upper and lower casing portions. The diaphragm members are formed in two halves and received in the respective casing halves, prior to assembly of the casing, to provide a unitary structure.

During operation of the turbine, transient thermal gradients are produced in the turbine casing and the diaphragm members. The resulting differential thermal expansion between the diaphragms and the casing creates an appreciable problem in providing a suitable connection therebetween. To maintain a running seal between the diaphragms and the rotor shaft, requires that the center lines of the diaphragm bores be properly positioned in relation to the center line of the rotor shaft at assembly, and that this relationship be maintained during turbine operation. Some of the common adverse effects caused by misalignment are rotor vibrations caused by seals rubbing on the rotor shaft, and loss in turbine efficiency resulting from opening of the diaphragm seal clearances. Also, under the prevailing thermal conditions, a rigid diaphragm support could cause buckling of the diaphragm with resulting deformation at the rotor shaft seals, or possible cracking of the casing.

Heretofore, various means have been employed to achieve a diaphragm support which would permit radial expansion of the diaphragm and provide a suitable seal between the diaphragm and the rotor shaft.

It is an object of this invention to provide an improved arrangement and structure for supporting a diaphragm in an axial flow machine, such as a turbine or compressor, which arrangement and structure permits radial expansion of the diaphragm within the casing, while maintaining a fixed relation between the diaphragm bore and the rotor shaft.

A further object of this invention is to provide an improved diaphragm support for machines of the above type which is simple to manufacture and easily adjustable, thereby reducing the cost of manufacture and costly fitting at assembly.

The aforesaid objects of the invention and other objects, which will become apparent as the description proceeds, are achieved by providing an arrangement for supporting the diaphragm in the casing, which arrangement comprises a support member and a support shelf; one of which is located on the diaphragm, the other being located on the casing.

The support shelf surface, generally, comprises a planar surface formed adjacent and parallel to the plane of separation of the casing and disposed in a manner to register with the support member. The support member may take the form of a rotatable block having a plurality of surfaces, each of which may be positioned to register with the shelf surface. By forming the support shelf with a portion extending radially inwardly beyond the block, and a portion extending radially outwardly beyond the block, with respect to the casing, the block and the support shelf are permitted relative movement, thereby allowing the diaphragm to expand or contract radially relative to the casing. The block surfaces are unequally spaced from the center of rotation of the block to permit variable positioning of the diaphragm in the casing in a direction normal to the shelf surface, thereby providing for adjustable location of the diaphragm bore center line in relation to the shaft center line.

Although the principles of the invention are broadly applicable to any embodiment wherein it is desirable to support a disc type member within the casing of an elastic fluid utilizing machine, the invention is usually employed to support a nozzle diaphragm in an axial flow turbine casing and hence, it has been so illustrated and will be so described.

For a better understanding of the invention, reference should be had to the accompanying drawings, wherein.

Figure 1:
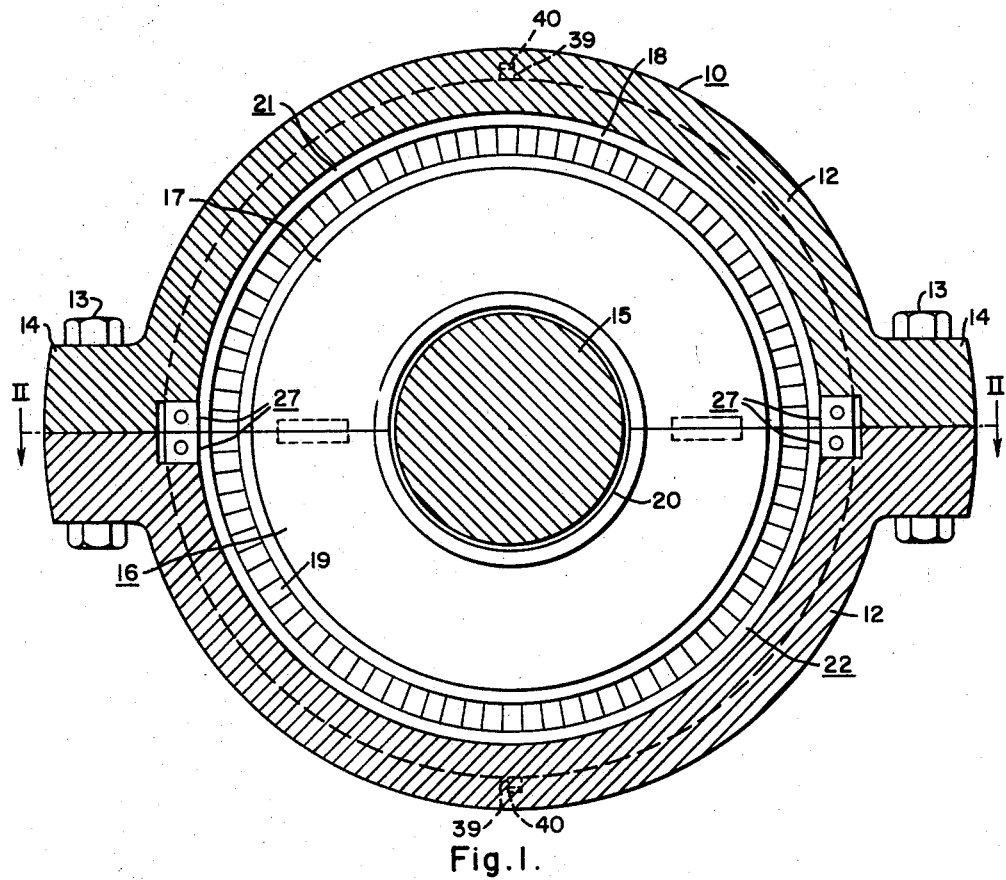
FIGURE 1 is a transverse sectional view of an elastic fluid turbine of the axial flow type having a structure for supporting a diaphragm in accordance with the invention.

With specific reference to the drawings, FIG. 1 shows a portion of a machine 10 such as an axial flow turbine, having a circular cross section and divided along its horizontal axial plane 11 into an upper casing half member and a lower casing half member, each of the semi-circular shape and designated by the numeral 12. The upper and lower casing halves 12 are joined by suitable means such as a plurality of bolts 13 received in outwardly extending flanges 14.

A rotor shaft 12 is disposed axially within the casing and is mounted for rotation in a pair of suitable bearing surfaces located in each of the opposite casing end walls, which bearings and end walls do not appear in the drawings.

The turbine 10 is divided into stages by a plurality of circular nozzle diaphragm structures 16 located within the turbine between the inner wall of the casing and the rotor shaft 15. Since the diaphragm structures 16 may be identical, only one will be described.

The diaphragm 16 comprises a disc 17, an annular shroud 18, an annular array of blades 19 disposed between the disc and the shroud, and a seal ring 20. The blades 19 function to direct elastic fluid toward rotor blades (not shown) located between adjacent diaphragms 16 and attached to the rotor shaft 15 for rotation within the casing 10.

The diaphragm 16 is split along the horizontal axial plane 11 into an upper semicircular half member 21 and a lower semicircular half member 22.

Figure 3:
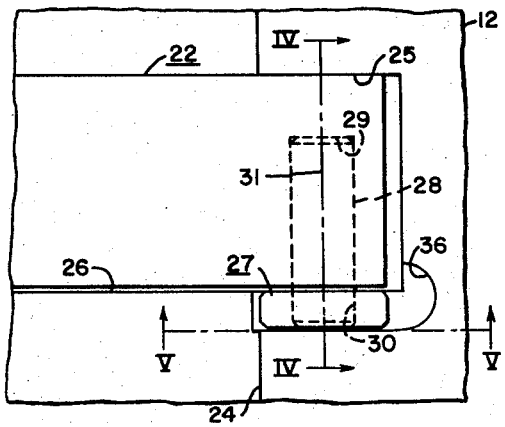
FIG. 3 is a detail fragmentary view of a portion of the structure shown in FIG. 2, taken on a larger scale.
Figure 4:
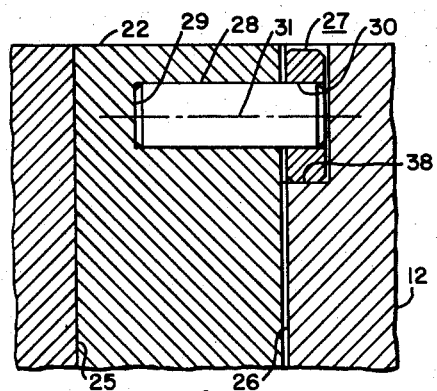
FIG. 4 is a sectional view taken along the line IV—IV in FIG. 3.

Referring to FIG. 1, an annular groove 23, of greater diameter than the diaphragm 16, is formed in the inner wall 24 of the casing 12 for receiving the shroud 18 of the diaphragm 16. In the assembled position, the diaphragm 16 is supported in the casing 12 such that the seal ring 20 maintains a rotary seal with the rotor shaft 15 at its inner periphery. As shown in FIG. 3, the outer periphery of shroud 18 is received between radially extending surfaces 25 and 26 of the groove 23, in a manner to provide suitable clearance between the groove surface 23 and the shroud.

The structure thus far described is well known in the art and is typical of elastic fluid machines of the axial flow type, in which the present invention may be advantageously employed.

In accordance with the invention, the lower diaphragm half 22 is provided with a pair of support blocks 27 located adjacent the horizontal axial plane 11 near opposite peripheral ends of the diaphragm half. Each support block 27 is rotatably mounted to the diaphragm half 22 by a pin 28, which pin may be tightly received in a hole 29 in the face of the diaphragm 22 and received as a sliding fit in a hole 30 in the support block 27, providing a rotational axis 31 extending through the center line of the pin. Planar surfaces 32, 33, 34 and 35 are formed on the support block 27 for movement about the rotational axis 31, each respective surface being located a different radial distance from the axis, for a purpose which will become apparent as the description proceeds.

A pair of recesses 36 are provided in the casing 12, adjacent the horizontal axial plane 11, for receiving each of the support blocks 27. The recesses 36 are each formed in a manner to provide a surface 37 generally parallel to the groove surface 26, and a horizontal surface, or support shelf 38, extending radially beyond the registering support block 27.

In assembling the diaphragm half 22 in the casing half 12, the diaphragm half is first lowered into place between the groove surfaces 25 and 26, and allowed to come to rest with both support blocks 27 in registering abutment with the corresponding support shelf 38, thereby providing vertical support between the diaphragm half and the casing half. In the assembled position, the support blocks 27 do not interrupt, or otherwise adversely affect, the pressure seal across the diaphragm which is maintained throughout the full arcuate circumference of the diaphragm half 22 by contact with the groove surface 25.

Figure 5:
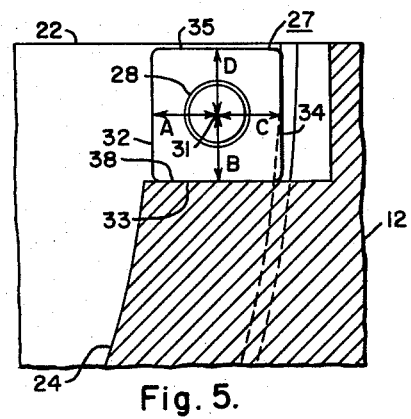
FIG. 5 is a sectional view taken along line V—V in FIG. 3.
Figure 6:
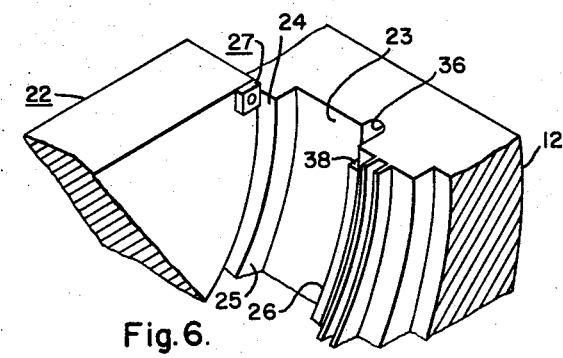
FIG. 6 is a perspective view showing a portion of a diaphragm and the associated casing structure.

Referring now to FIG. 5, the surfaces 32, 33, 34 and 35 are radially spaced from the axis of rotation 31 respective unequal distances A, B, C and D. By way of example and not of restriction, let it be assumed that A equals .498 inch, B equals .500 inch, C equals .502 inch and D equals .504 inch. Let it further be assumed that initially the diaphragm half 22 is placed in the casing half 12 with the support blocks 27 positioned such that surface 33 of each block registers with the corresponding support shelf 38.

Figure 2:
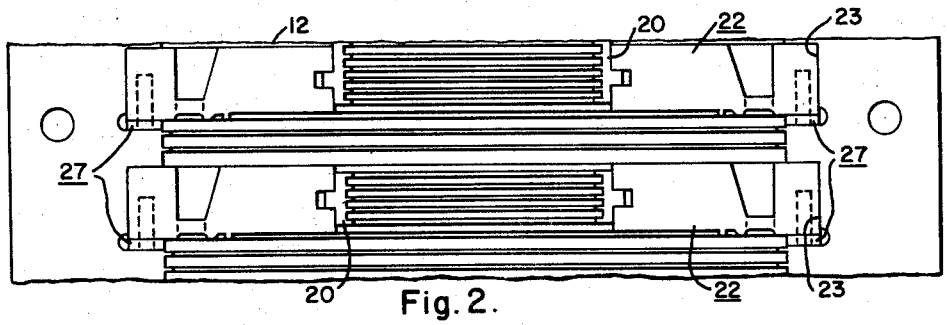
FIG. 2 is a sectional view taken along the line II—II in FIG. 1 showing a longitudinal portion of the turbine, with the rotor omitted for clarity.

With the diaphragm half 22 in place as shown in FIG. 2, a measurement may be taken to determine if the diaphragm seal ring 20 is properly located to provide the required clearance between the ring and the rotor shaft 15 when the assembly is completed. If vertical adjustment between the diaphragm half 22 and the casing half 12 is required, the support blocks 27 may be rotated individually or jointly, as required, to achieve such adjustment.

Should a measurement indicate the necessity to raise the diaphragm half 22 vertically in relation to the casing half 12, the diaphragm half may be raised slightly to allow rotation of the support blocks 27. For example, if surface 33 is moved out of registry and surface 34 is moved into registry with the support shelf 38, the diaphragm half 22, and consequently the seal ring 20, is raised vertically .002 inch when the diaphragm half is replaced. In like manner, should a measurement indicate the need to do so, the diaphragm half 22 may be raised .004 inch or lowered .002 inch from its initial position by registering respective surfaces 35 or 32 with the corresponding support shelf 38.

The above procedure may likewise be followed to locate upper diaphragm half 21 in upper casing half 12, after which the casing halves may be assembled into the turbine in the usual manner.

It should here be mentioned that, in addition to vertical support for the diaphragm halves 21 and 22, it is necessary to properly locate the diaphragm in a horizontal direction transverse to the rotor shaft 15. As shown in FIG. 1, such arrangement may take the form of a dowel pin 39 tightly received by the shroud 18 and extending radially outwardly into slidable engagement with a hole 40 in casing half 12. The axes of the pin 39 and hole 40 are disposed in a vertical central plane, thereby permitting vertical adjustment of the diaphragm half 21 and 22 with respect to the shaft 15, while maintaining a substantially fixed relation between the diaphragm half and the shaft in a horizontal direction transverse thereto.

During operation of the turbine, the hot elastic fluid entering the casing 10 impinges on the diaphragm 16 and the inner casing walls, thereby transferring heat thereto. Differential thermal gradients are established in the diaphragm 16 and the casing 10, resulting in movement of the diaphragm in radial directions relative to the casing. The present invention allows such movement to take place in the following manner:

Should a differential in thermal gradient occur between the diaphragm 16 and the casing 12, radial forces are set up at the points of contact between the two structures. In practicing the present invention, these forces are exerted at the area of contact between the support blocks 27 and the respective support shelves 38. When these forces reach a value great enough to overcome the frictional force between the blocks 27 and the respective shelves 38, the blocks are free to slide radially over the shelves. This relative movement between the casing 10 and the diaphragm 16 occurs without applying any excessive forces to the diaphragm or the casing, thereby preventing distortion of the diaphragm and the resulting misalignment at the seal ring 20.

From the foregoing description, it will be apparent that the invention provides an improved arrangement for supporting a diaphragm in a turbine casing, which arrangement permits radial expansion of the diaphragm in relation to the casing while maintaining a fixed vertical relation between the rotor shaft center line and diaphragm bore center line. Further, by the provision of a support structure which may be easily adjusted at assembly, costly fitting of the diaphragm in the casing is reduced.

While the invention has been shown in but one form, it will be obvious to those skilled in the art that it is not so limited, but is susceptible of various changes and modifications without departing from the spirit thereof.

What is claimed is:

1. An elastic fluid utilizing machine comprising
   a casing divided transversely at a horizontal axial plane into an upper casing half member and a lower casing half member,
   a diaphragm comprising an upper diaphragm half member and a lower diaphragm half member,
   and means for adjustably supporting said lower diaphragm half member in said lower casing half member,
   said means including a support shelf formed in one of said lower half members,
   and a support block pivotally mounted on the other of said lower half members, said shelf and said support block being disposed adjacent said horizontal axial plane,
   said support block having an axis of rotation and a plurality of planar surfaces disposed at different radial distances from said axis of rotation,
   said surfaces being rotatively positionable to register with said support shelf,
   said shelf having a planar surface extending radially outwardly, with respect to said casing, beyond said support block, thereby permitting radial movement of said lower diaphragm half member in relation to said lower casing half member.

2. An elastic fluid utilizing machine comprising
   a casing divided transversely at a horizontal axial plane into an upper casing half member and a lower casing half member,
   a diaphragm comprising an upper diaphragm half member and a lower diaphragm half member, and means for adjustably supporting one of said diaphragm half members in a corresponding casing half member, said means including a support shelf formed in said corresponding casing half member, and a support block pivotally mounted on said one diaphragm half member, said shelf and said support block being disposed adjacent said horizontal axial plane, said support block having an axis of rotation and a plurality of planar surfaces disposed at different radial distances from said axis of rotation, said surfaces being rotatively positionable to register with said support shelf, said shelf having a planar surface extending radially outwardly, with respect to said casing beyond said support block, thereby permitting radial movement of said one diaphragm half member in relation to said corresponding casing half member.

3. An elastic fluid utilizing machine comprising
a casing divided transversely at a horizontal axial plane into an upper casing half member and a lower casing half member,
a diaphragm comprising an upper diaphragm half member and a lower diaphragm half member,
and means for adjustably supporting said lower diaphragm half member in said lower casing half member,
said means including a pair of support shelves formed in one of said lower half members,
and a pair of support blocks pivotally mounted on the other of said lower half members for registry with said support shelves, each of said support blocks and its registering support shelf being disposed adjacent said horizontal plane and diametrically opposite the other,
said support blocks each having an axis of rotation and a plurality of planar surfaces disposed at different radial distances from said axis of rotation,
said surfaces being rotatively movable to contact one of said registering support shelves, and
each of said shelves extending radially outwardly, with respect to said casing, beyond said registering support block, thereby permitting radial movement of said lower diaphragm half member in relation to said lower casing half member.

4. An elastic fluid utilizing machine as in claim 3, wherein one of said support blocks is mounted on said lower diaphragm half member and its registering support shelf is formed in said lower casing half member.

5. An elastic fluid utilizing machine comprising
a casing divided transversely at a horizontal axial plane into an upper casing half member and a lower casing half member,
a diaphragm comprising an upper diaphragm half member and a lower diaphragm half member,
and means for adjustably supporting one of said diaphragm half members in a corresponding casing half member,
said means including a pair of support shelves formed in said corresponding casing half member,
and a pair of support blocks pivotally mounted on said one diaphragm half member for registry with said support shelves,
each of said support blocks and its registering support shelf being disposed adjacent said horizontal plane and diametrically opposite the other,
said support blocks each having an axis of rotation and a plurality of planar surfaces disposed at different radial distances from said axis of rotation,
said surfaces being rotatively movable to contact one of said registering support shelves,
each of said shelves extending radially outwardly, with respect to said casing, beyond said registering support block, thereby permitting radial movement of said one diaphragm half member in relation to said corresponding casing half member.

References Cited in the file of this patent
UNITED STATES PATENTS

| 1,352,277 | Junggren | Sept. 7, 1920 |
| 2,247,378 | Hinrichs | July 1, 1941 |
| 2,247,387 | Johnson et al. | July 1, 1941 |
| 2,247,423 | Webster | July 1, 1941 |
| 2,729,260 | Matson | Jan. 3, 1956 |
| 2,888,240 | Fleischmann et al. | May 26, 1959 |
| 3,104,091 | Vivian | Sept. 17, 1963 |

OTHER REFERENCES

German application, 1,004,201, Mar. 14, 1957.